United States Patent
Oh et al.

(10) Patent No.: US 9,905,193 B2
(45) Date of Patent: Feb. 27, 2018

(54) HOST FOR CONTROLLING FREQUENCY OF OPERATING CLOCK SIGNAL OF DISPLAY DRIVER IC AND SYSTEM INCLUDING THE SAME

(71) Applicant: SAMSUNG ELECTRONICS CO., LTD., Suwon-si (KR)

(72) Inventors: Hee Tae Oh, Seongnam-si (KR); Dong Hwy Kim, Hwaseong-si (KR); Do Kyung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 410 days.

(21) Appl. No.: 14/329,207

(22) Filed: Jul. 11, 2014

(65) Prior Publication Data

US 2015/0015591 A1    Jan. 15, 2015

Related U.S. Application Data

(60) Provisional application No. 61/845,183, filed on Jul. 11, 2013.

(30) Foreign Application Priority Data

Oct. 8, 2013    (KR) .................. 10-2013-0120011
Jun. 30, 2014   (KR) .................. 10-2014-0080512

(51) Int. Cl.
*G09G 5/00*    (2006.01)
*G06F 3/14*    (2006.01)

(52) U.S. Cl.
CPC ............... *G09G 5/006* (2013.01); *G06F 3/14* (2013.01); *G09G 2360/18* (2013.01)

(58) Field of Classification Search
CPC ...... G09G 5/18; G09G 2320/02; G09G 5/006; G09G 3/14
See application file for complete search history.

(56) References Cited

U.S. PATENT DOCUMENTS 5,751,267 A    5/1998 Sato et al.
6,930,667 B1   8/2005 Iijima et al.
(Continued)

FOREIGN PATENT DOCUMENTS

JP          7-64059 A    3/1995
JP     2000-241801 A    9/2000
(Continued)

*Primary Examiner* — Sepehr Azari
(74) *Attorney, Agent, or Firm* — Sughrue Mion, PLLC

(57) ABSTRACT

A display driver integrated circuit (DDI) for driving a display of image data on a display panel, an application processor (AP), a system including the DDI and the AP, and methods of operating the same are provided. The application processor includes: a controller configured to obtain a frequency of a data transmission timing control received from a display driver integrated circuit (DDI), and to generate, based on the obtained frequency, a frequency control signal for adjusting a frequency related to an operating clock signal for the DDI; a transmitter configured to transmit the generated frequency control signal to the DDI; and a frequency calculation circuit including: a detector configured to receive the data transmission timing control signal from the DDI, and a frequency calculator configured to calculate a frequency of the received data transmission timing control signal.

20 Claims, 16 Drawing Sheets

(56) References Cited

U.S. PATENT DOCUMENTS

| | | |
|---|---|---|
| 8,054,282 B2 | 11/2011 | Park et al. |
| 8,199,085 B2 | 6/2012 | Kim et al. |
| 2004/0150606 A1 | 8/2004 | Preston |
| 2008/0278508 A1* | 11/2008 | Anderson ............. G06F 3/1462 345/519 |
| 2011/0221739 A1* | 9/2011 | Masui .................... H04N 1/053 345/213 |
| 2012/0098815 A1 | 4/2012 | Hou et al. |
| 2013/0057763 A1 | 3/2013 | Cha et al. |

FOREIGN PATENT DOCUMENTS

| | | |
|---|---|---|
| JP | 2005-91385 A | 4/2005 |
| KR | 10-2008-0051952 A | 6/2008 |
| KR | 10-2011-0094839 A | 8/2011 |

\* cited by examiner

HOST FOR CONTROLLING FREQUENCY OF OPERATING CLOCK SIGNAL OF DISPLAY DRIVER IC AND SYSTEM INCLUDING THE SAME

CROSS-REFERENCE TO RELATED APPLICATIONS

This application claims the benefit of U.S. provisional patent application No. 61/845,183, filed on Jul. 11, 2013, and claims priority from Korean Patent Application No. 10-2013-0120011, filed on Oct. 8, 2013 in the Korean Intellectual Property Office (KIPO), and Korean Patent Application No. 10-2014-0080512, filed on Jun. 30, 2014 in the KIPO, the entire contents of each of which are hereby incorporated by reference.

BACKGROUND

1. Technical Field

Apparatuses and methods consistent with exemplary embodiments relate to a host, and more particularly, to a host for controlling the frequency of an operating clock signal of a display driver integrated circuit (IC) based on a data transmission timing control signal output from the display driver IC, a system including the same, and a method of operating the system.

2. Description of the Related Art

Mobile devices including a liquid crystal display (LCD) panel drive the LCD panel in various modes including a video mode or a command mode. Mobile Industry Processor Interface Display Serial Interface (MIPI® DSI) is a related art display standard for portable electronic devices.

MIPI supports two display modes, i.e., the video mode and the command mode. In the command mode, the start of frame data transmission from a host is controlled by a tearing effect (TE) signal. In the video mode, frame data is transmitted from the host to a panel in real time.

When a still image is displayed on a display panel, a display driver IC periodically reads the still image from a frame buffer included in the display driver IC and displays the still image on the display panel, which is referred to as a panel self-refresh. At this time, the display driver IC performs the panel self-refresh using a clock signal output from a resistor-capacitor (RC) oscillator. Since the RC oscillator is sensitive to temperature variation, the frequency of the clock signal may deviate. This deviation causes electromagnetic interference (EMI), which interferes with the operating frequency of other devices, e.g., a touch screen, a stylus pen, etc.

When the display driver IC transmits a TE signal to the host in the command mode, the host transmits frame data to the display driver IC based on the TE signal. The TE signal is used to prevent tearing or screen tearing. The tearing or screen tearing is a visual artifact appearing when image data corresponding to at least two different frames is displayed simultaneously on a single screen on a display panel.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a display driver integrated circuit (DDI) for driving a display of image data on a display panel, the DDI including: a control signal generator configured to generate a control signal based on an operating clock signal, and to transmit the generated control signal to an external device; a receiver configured to receive, in response to the transmitted control signal, a first frequency control signal from the external device; and a controller configured to output, based on the received first frequency control signal, a second frequency control signal to adjust a frequency related to the operating clock signal.

The control signal may be a tearing effect signal, and the receiver may be configured to receive, in response to the transmitted control signal, the image data from the external device.

The DDI may further include an oscillator configured to output the operating clock signal to the control signal generator, wherein the controller may be configured to output the second frequency control signal to the oscillator to adjust a frequency of the operating clock signal.

The controller may be configured to output the second frequency control signal to the control signal generator; and the control signal generator may be configured to adjust, according to the output second frequency control signal and the operating clock signal, a frequency of the generated control signal.

The control signal generator may be configured to adjust the frequency of the generated control signal according to a ratio between a deviated frequency of the operating clock signal and the frequency of the generated control signal.

The receiver may be a Mobile Industry Processor Interface (MIPI) receiver.

The DDI may further include an image processor configured to output the image data to the display panel, wherein the receiver may be configured to receive, in response to the transmitted control signal, the image data from the external device.

The DDI may further include a frame buffer configured to buffer the image data, wherein the controller may be configured to control writing of the received image data to the frame buffer, and to control reading, according to the operating clock signal, of the received image data from the frame buffer to be output to the display panel.

According to an aspect of another exemplary embodiment, there is provided an application processor for a display system of a portable device that displays image data on a display panel, the application processor including: a controller configured to obtain a frequency of a data transmission timing control signal received from a display driver integrated circuit (DDI), and to generate, based on the obtained frequency, a frequency control signal for adjusting a frequency related to an operating clock signal for the DDI; a transmitter configured to transmit the generated frequency control signal to the DDI; and a frequency calculation circuit including: a detector configured to receive the data transmission timing control signal from the DDI, and a frequency calculator configured to calculate a frequency of the received data transmission timing control signal.

The frequency calculator may be configured to output the calculated frequency to the controller.

The frequency calculation circuit may further include: a frequency comparer configured to determine whether the calculated frequency is within a predetermined operating frequency range for the DDI, to generate a control signal according to the determining, and to output, to the controller, the generated control signal.

The frequency comparer may generate, as the control signal, a first control signal in response to the calculated frequency being lower than the predetermined operating frequency range, a second control signal in response to the calculated frequency being within the predetermined operating frequency range, and a third control signal in response to the calculated frequency being higher than the predetermined operating frequency range.

The frequency calculation circuit may further include a frequency counter configured to determine a count value, based on a reference clock signal, of a period of the received data transmission timing control signal, wherein the frequency calculator may be configured to calculate, based on the determined count value, the frequency of the received data transmission timing control signal.

The detector may include an edge detector configured to detect the period of the received data transmission timing control signal based on a rising edge or a falling edge of the received data transmission timing control signal.

The frequency calculation circuit may further include a frequency divider configured to divide the reference clock signal by a predetermined factor, wherein the frequency counter may be configured to determine the count value based on the divided reference clock signal.

According to an aspect of another exemplary embodiment, there is provided a method of controlling a frequency of an operating clock signal for a display, the method including: receiving, by a host, a signal from a display driver integrated circuit (DDI); calculating, based on a reference clock signal, a frequency of the received signal; generating, based on the calculated frequency, a frequency control signal for adjusting a frequency related to an operating clock signal for the DDI; and transmitting the generated frequency control signal to the DDI.

The generating the frequency control signal may include generating the frequency control signal in response to the calculated frequency being outside of a predetermined operating frequency range for the DDI.

The method may further include transmitting image data to the DDI in response to the received signal, which is a tearing effect signal.

The calculating the frequency may include: determining a count value, based on the reference clock signal, of a period of the received signal; and calculating, based on the determined count value, the frequency of the received signal.

According to an aspect of another exemplary embodiment, there is provided a method of controlling a frequency of an operating clock signal for a display, the method including: generating, by a DDI, a control signal based on an operating clock signal; transmitting the generated control signal to a host; receiving, in response to the transmitted control signal, a first frequency control signal from the host; and adjusting, based on the received first frequency control signal, a frequency of the control signal.

The adjusting the frequency of the control signal may include adjusting the frequency of the control signal by adjusting a frequency of the operating clock signal.

The adjusting the frequency of the control signal may include adjusting the frequency of the control signal according to a ratio between a deviated frequency of the operating clock signal and the frequency of the control signal.

The control signal may be a tearing effect signal.

According to an aspect of another exemplary embodiment, there is provided a display system that displays image data, the display system including: an application processor including: a first controller configured to obtain, from a frequency calculation circuit, a frequency of a signal provided by a display driver integrated circuit (DDI), and to generate, based on the obtained frequency, a first frequency control signal for adjusting a frequency related to an operating clock signal for the DDI, and a transmitter configured to transmit the generated first frequency control signal to the DDI; the frequency calculation circuit configured to receive the signal from the DDI, to calculate, based on a reference clock signal, the frequency of the received signal, and to provide the calculated frequency to the first controller; and the DDI configured to drive a display of the image data on a display panel, the DDI including: a control signal generator configured to generate the signal based on the operating clock signal, and to provide the generated signal to the application processor and the frequency calculation circuit; a receiver configured to receive, in response to the provided signal, the first frequency control signal from the application processor; and a second controller configured to output, based on the received first frequency control signal, a second frequency control signal to adjust the frequency related to the operating clock signal.

The display system may be a portable device and the application may be a host.

The display system may further include the display panel, the display panel including a touch screen configured to receive an input from a stylus.

The signal may be a tearing effect signal.

The DDI may include an oscillator configured to output the operating clock signal, wherein the DDI may be configured to adjust a frequency of the operating clock signal according to the second frequency control signal.

The DDI may be configured to adjust, according to the second frequency control signal and the operating clock signal, a frequency of the generated signal.

The DDI may be configured to adjust the frequency of the generated signal according to a ratio between a deviated frequency of the operating clock signal and the frequency of the generated signal.

According to an aspect of another exemplary embodiment, there is provided an application processor for a display system of a portable device that displays image data on a display panel, the application processor including: a controller configured to obtain a frequency of a signal received from a display driver integrated circuit (DDI), and to generate, based on the obtained frequency, a frequency control signal for adjusting a frequency related to an operating clock signal for the DDI; and a transmitter configured to transmit the generated frequency control signal to the DDI.

The received signal may be a tearing effect signal, and the controller may be configured to control the transmitter to transmit the image data to the DDI in response to the received tearing effect signal.

The controller may be configured to generate the frequency control signal in response to the obtained frequency being outside of a predetermined operating frequency range for the DDI.

The application processor may further include a frequency calculation circuit configured to receive the signal from the DDI, and to calculate, based on a reference clock signal, the frequency of the received signal, wherein the controller may be configured to generate the frequency control signal based on the calculated frequency.

The frequency calculation circuit may include: a frequency counter configured to determine a count value, based on the reference clock signal, of a period of the received signal; and a frequency calculator configured to calculate, based on the determined count value, the frequency of the received signal.

The frequency calculation circuit may further include an edge detector configured to detect the period of the received signal based on a rising edge or a falling edge of the received signal.

The frequency calculation circuit may further include a frequency divider configured to divide the reference clock signal by a predetermined factor, and the frequency counter may be configured to determine the count value based on the divided reference clock signal.

The frequency calculation circuit may further include a frequency comparer configured to determine whether the calculated frequency is within a predetermined operating frequency range for the DDI, and to output a control signal to the controller according to the determining, and the controller may generate the frequency control signal according to the output control signal.

The frequency comparer may output, as the control signal, a first interrupt signal in response to the calculated frequency being less than the predetermined operating frequency range, and a third interrupt signal in response to the calculated frequency being greater than the predetermined operating frequency range, and the controller may generate the frequency control signal to adjust the frequency in response to the output first interrupt signal or the output third interrupt signal.

The controller may be a CPU.

The controller may an image processing circuit.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF EXEMPLARY EMBODIMENTS

Figure 1:
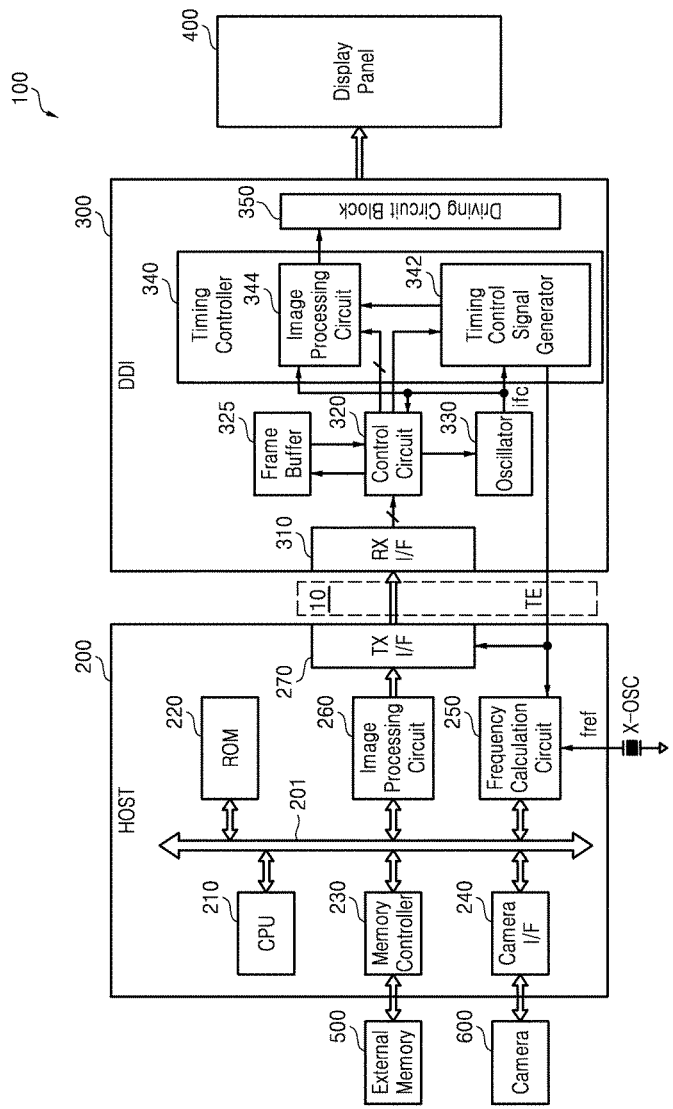
FIG. 1 is a block diagram of a system according to an exemplary embodiment.

Exemplary embodiments will be described more fully hereinafter with reference to the accompanying drawings. An exemplary embodiment may, however, be embodied in many different forms and should not be construed as limited to exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing exemplary embodiments and is not intended to be limiting of the inventive concept. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a system 100 according to an exemplary embodiment. Referring to FIG. 1, the system 100 includes a host 200, a display driver IC (DDI) 300, a display panel 400, an external memory 500, and a camera 600.

The system 100 may be implemented as a cellular phone, a smart phone, a tablet device, a personal computer (PC), a portable device, a multimedia player, a mobile internet device (MID), an Internet of things (IoT) device, an Internet of everything (IoE) device, a wearable computer, a smart device, etc.

By way of example, when the system 100 supports Mobile Industry Processor Interface (MIPI®), the system 100 may also support a panel self-refresh (PSR). The PSR is an operation of periodically displaying still image data stored in a frame buffer 325 of the DDI 300 on the display panel 400.

In one or more exemplary embodiments, the system 100 may support the MIPI command mode and/or the MIPI video mode supporting the PSR. However, it is understood that one or more other exemplary embodiments are not limited thereto. For example, according to another exemplary embodiment, the system 100 may include an interface supporting an embedded DisplayPort (eDP) standard.

The host 200 may receive a data transmission timing control signal TE from the DDI 300, calculate a frequency of the data transmission timing control signal TE using a reference clock signal "fref," generate a first frequency control signal for adjusting the frequency of an operating clock signal of the DDI 300 based on the calculation result, and output the first frequency control signal to the DDI 300.

In addition, whenever transmitting image data (e.g., still image data or moving image data) to the DDI 300, the host may transmit the image data to the DDI 300 based on or using the transmission timing control signal TE.

In other words, the transmission timing control signal TE controls the transmission timing of image data transmitted from the host 200 to the DDI 300. Accordingly, the data transmission timing control signal TE may be a tearing effect (TE) signal used in MIPI. Also, when the host 200 transmits image data to the DDI 300 in response to a certain signal output from the DDI 300 to prevent TE, it may be said that the certain signal operates as the transmission timing control signal TE regardless of the type of interface between the host 200 and the DDI 300. While in the present exemplary embodiment, the host 200 receives a data transmission timing control signal TE (such as a tearing effect TE signal), it is understood that one or more other exemplary embodiments are not limited thereto, and the host 200 may receive any signal or control signal from the DDI 300, a frequency of the received signal being based on an operating clock signal of the DDI 300.

The host 200 may be implemented as an integrated circuit (IC), a system on chip (SoC), a processor, an application processor (AP), a mobile AP, etc. The host 200 may include a central processing unit (CPU) 210, a read only memory (ROM) 220, a memory controller 230, a camera interface (I/F) 240, a frequency calculation circuit 250, an image processing circuit 260, and a transmit interface (TX I/F) 270.

The CPU 210 may control an operation of at least one of the elements 220, 230, 240, 250, 260, and 270 through a bus 201. The CPU 210 may include at least one core. The CPU 210 may execute an operating system (OS) output from the external memory 500 during a boot. According to a control of the OS, the CPU 210 may generate the first frequency control signal for adjusting the frequency of the operating clock signal of the DDI 300 and may transmit the first frequency control signal to the DDI 300 via the TX I/F 270.

In other words, when it is necessary or determined to adjust the frequency of the operating clock signal of the DDI 300, the host 200 may transmit the first frequency control signal to the DDI 300. The first frequency control signal may be transmitted to the DDI 300 in a form of a command and may be transmitted to the DDI 300 through a transmission line that transmits image data.

The ROM 220 may store program codes and/or data used by the CPU 210.

The memory controller 230 may store data in the external memory 500 and may read data from the external memory 500. For example, the memory controller 230 may be a set of a dynamic random access memory (DRAM) controller and a flash-based memory controller. Accordingly, the external memory 500 may be a set of DRAM and flash memory.

The camera I/F 240 may receive image data captured by the camera 600 and transmit the image data to the memory controller 230 and/or the image processing circuit 260. When the system 100 supports MIPI, the camera 600 and the camera I/F 240 may communicate with each other using camera serial interface (CSI), e.g., CSI-2. The camera 600 may transmit image data to the camera I/F 240 using low-voltage differential signalling (LVDS).

The frequency calculation circuit 250 may receive the data transmission timing control signal TE from the DDI 300, calculate the frequency of the data transmission timing control signal TE using a reference clock signal related to the clock signal "fref" output from a crystal oscillator X-OSC, and transmit the calculation result to the CPU 210 through the bus 201. The CPU 210 may operate as a control circuit by generating the first frequency control signal for adjusting the frequency of the operating clock signal of the DDI 300 using the calculation result.

Although in the present exemplary embodiment, the frequency calculation circuit 250 calculates the frequency fcnt of the data transmission timing control signal TE, it is understood that, in one or more other exemplary embodiments, the CPU 210 may calculate the frequency fcnt of the data transmission timing control signal TE. For example, in this case, the frequency calculation circuit 250 may count a period of the data transmission timing control signal TE using the reference clock signal fref or frefd, generate a count value CNT corresponding to the count result, and provide the count value CNT to the CPU 210. The CPU 210 may then calculate the frequency fcnt of the data transmission timing control signal TE using the count value CNT.

Although the host 200 may include a separate control circuit for generating the first frequency control signal in one or more other exemplary embodiments, a circuit that generates a control signal for adjusting the frequency of the operating clock signal of the DDI 300 is referred to herein as a control circuit (e.g., the CPU 210).

The image processing circuit 260 processes and controls image data and/or command data to be transmitted to the DDI 300. The command data includes the first frequency control signal. The image data and/or the command data may be transmitted in a form of a data packet defined in MIPI. However, it is understood that one or more other exemplary embodiments are not limited thereto. For example, according to another exemplary embodiment, the image data and/or the command data may be transmitted in a data format defined in the eDP standard or a high-speed serial interface standard.

The TX I/F 270 may communicate with a receive interface (RX I/F) 310 of the DDI 300. The image data and/or command data may be transmitted from the host 200 to the DDI 300 via the image processing circuit 260 and the TX I/F 270. The TX I/F 270 may transmit the image data using a clock signal related to, based on, or equivalent to the clock signal fref output from the crystal oscillator X-OSC.

An interface 10 is connected between the host 200 and the DDI 300. By way of example, the interface 10 may be implemented to support MIPI, eDP, high-speed serial interface, etc.

The DDI 300 may process image data based on the image data and/or the command data transmitted from the host 200 and may transmit the processed image data to the display panel 400. At this time, the DDI 300 may perform the PSR using image data stored in the frame buffer 325.

The DDI 300 may adjust the frequency of its operating clock signal in response to the first frequency control signal transmitted from the host 200. The frequency of the operating clock signal may be the frequency of each of various operating clock signals for the operation of the DDI 300.

For example, the operating clock signal may be an internal clock signal "ifc" output from an oscillator 330 implemented within the DDI 300. At this time, the internal clock signal ifc of the oscillator 330 may be involved in the generation of the data transmission timing control signal TE and the generation of control signals for the PSR. The DDI 300 may be implemented as a mobile DDI. The DDI 300 includes the RX I/F 310, a control circuit 320, the frame buffer 325, the oscillator 330, a timing controller 340, and a driving circuit block 350.

The RX I/F 310 may convert the image data and/or the command data transmitted from the TX I/F 270 of the host 200 into a format suitable to the DDI 300. For example, when the RX I/F 310 supports MIPI, the RX I/F 310 may let a clock signal received through the interface 10 pass to the control circuit 320 and may restore data, a data enable signal, and synchronous signals (e.g., a vertical synchronous signal and a horizontal synchronous signal) from the image data (e.g., a data packet) using the clock signal.

The control circuit 320 may control an operation of the frame buffer 325, the oscillator 330, and/or the timing controller 340 based on one or more control signals output from the RX I/F 310.

In one or more exemplary embodiments, when the RX I/F 310 receives and outputs, to the control circuit 320, a first frequency control signal (or command) for controlling the frequency of the operating clock signal of the DDI 300, the control circuit 320 may generate a second frequency control signal based on the first frequency control signal. For example, when the first frequency control signal is transmitted in a form of a command, the second frequency control signal may be a decoded command. The oscillator 330 may adjust (e.g., increase or decrease) the frequency of the internal clock signal ifc in response to the second frequency control signal.

At this time, a timing control signal generator 342 may adjust the frequency of the data transmission timing control signal TE using the frequency-adjusted internal clock signal ifc and may output the data transmission timing control signal TE whose frequency has been adjusted to the host 200.

In one or more other exemplary embodiments, when the RX I/F 310 receives and outputs, to the control circuit 320, the first frequency control signal for controlling the frequency of the operating clock signal of the DDI 300, the control circuit 320 may directly control the timing control signal generator 342 using the second frequency control signal related to the first frequency control signal. For example, in this case, the control circuit 320 may control the timing control signal generator 342 to adjust (e.g., increase or decrease) a frequency of the data transmission timing control signal TE by adjusting a ratio between the internal clock signal ifc frequency and the data transmission timing control signal TE frequency, without the oscillator 330 adjusting (e.g., increasing or decreasing) the frequency of the internal clock signal ifc. Here, the ratio may be stored, e.g., in a register of the timing control signal generator 342. In this case, by way of example, if a frequency of the internal clock signal ifc deviates to double an original frequency, the ratio may be adjusted by adjusting a toggling cycle of the data transmission timing control signal TE (e.g., from one cycle of the data transmission timing control signal TE every 8 cycles of the internal clock signal to one cycle of the data transmission timing control signal TE every 16 cycles of the internal clock signal).

According to another exemplary embodiment, the oscillator 330 may adjust (e.g., increase or decrease) the frequency of the internal clock signal ifc using the second frequency control signal and the control circuit 320 may directly control the timing control signal generator 342 using the second frequency control signal. For example, in this case, the control circuit 320 may control the timing control signal generator 342 to adjust (e.g., increase or decrease) the frequency of the data transmission timing control signal TE by adjusting a ratio between the adjusted internal clock signal ifc frequency (adjusted by the oscillator 330) and the data transmission timing control signal TE frequency.

The timing control signal generator 342 may adjust (e.g., increase or decrease) the frequency of the data transmission timing control signal TE in response to the second frequency control signal and may output the data transmission timing control signal TE whose frequency has been adjusted to the host 200. For example, when the DDI 300 supports MIPI, the timing control signal generator 342 may be implemented as a TE signal generator.

The control circuit 320 may write the image data received by and output from the RX I/F 310 to the frame buffer 325 using write control signals. The write control signals are signals to write the image data to the frame buffer 325. The control circuit 320 may also read image data from the frame buffer 325 using read control signals generated using the internal clock signal ifc of the oscillator 330 and transmit the image data to an image processing circuit 344 included in the timing controller 340.

The image processing circuit 344 processes the image data output from the control circuit 320 using the internal clock signal ifc of the oscillator 330 and outputs display data corresponding to the processing result and synchronous signals (e.g., a vertical synchronous signal, a horizontal synchronous signal, and a data enable signal) for the display data to the driving circuit block 350.

The driving circuit block 350 may drive the display data to the display panel 400 according to the display data and the synchronous signals output from the image processing circuit 344. Furthermore, it is understood that the driving circuit block 350 may include at least one source driver and at least one gate driver. The display panel 400 may be implemented as a thin-film-transistor liquid-crystal display (TFT-LCD) panel, an organic light-emitting diode (OLED) display panel, an active-matrix OLED (AMOLED) display panel, a flexible display panel, an LCD panel, etc.

Figure 2:
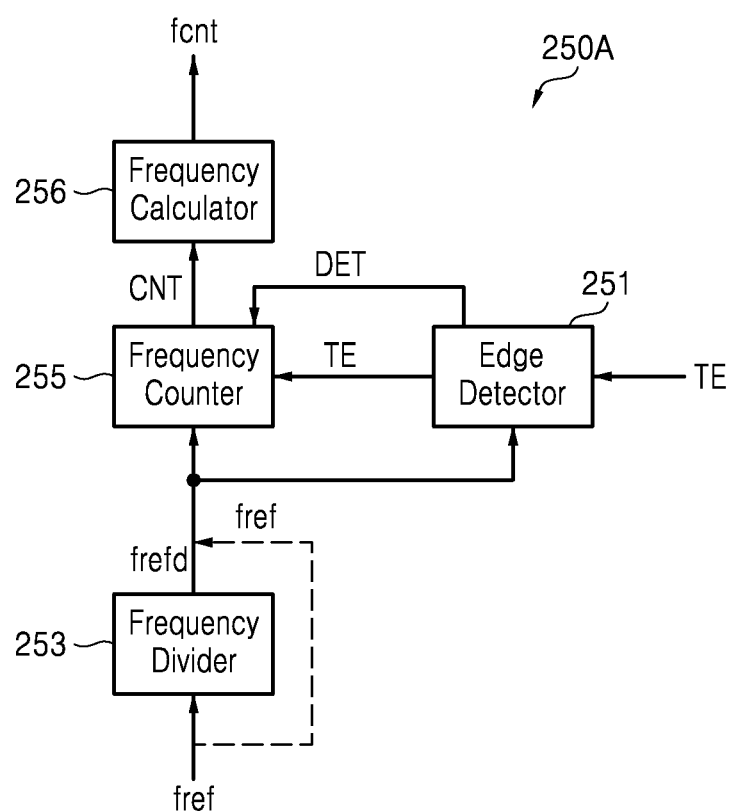
FIG. 2 is a block diagram of a frequency calculation circuit according to an exemplary embodiment.
Figure 4:
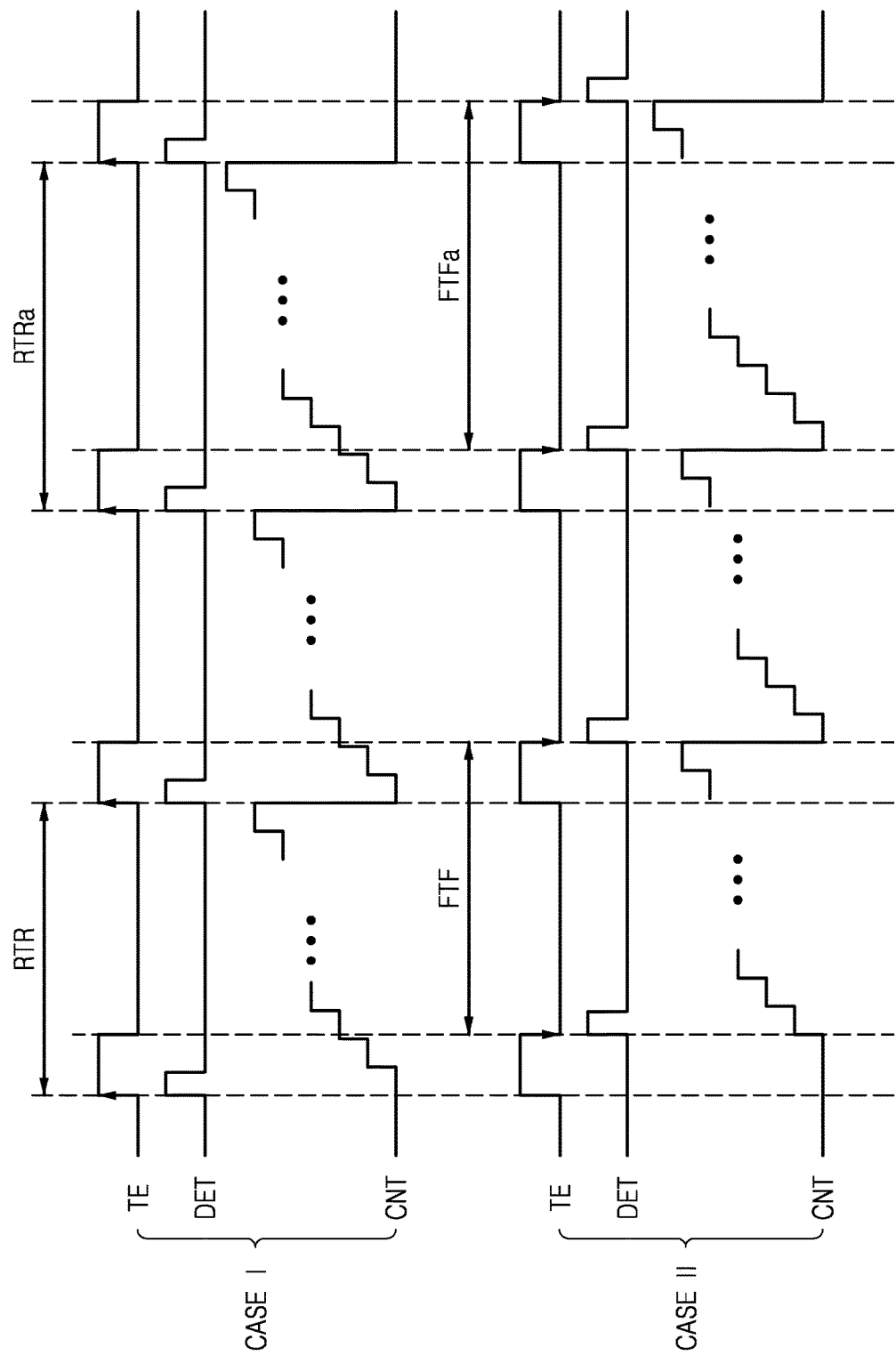
FIG. 4 is a timing chart of an operation of a frequency calculation circuit according to an exemplary embodiment.

FIG. 2 is a block diagram of a frequency calculation circuit 250A according to an exemplary embodiment. By way of example, the frequency calculation circuit 250A may be implemented as the frequency calculation circuit 250 illustrated in FIG. 1. FIG. 4 is a timing chart of an operation of the frequency calculation circuit 250A according to an exemplary embodiment. Referring to FIG. 2, the frequency calculation circuit 250A includes an edge detector 251, a frequency counter 255, and a frequency calculator 256. The frequency calculation circuit 250A may also include a frequency divider 253.

Referring to CASE I in FIG. 4, the frequency calculation circuit 250A may count a particular period (e.g., a rising edge-to-rising edge interval (hereinafter, referred to as a "first period")) RTR of the data transmission timing control signal TE using the reference clock signal fref or frefd and may calculate a frequency fcnt of the data transmission timing control signal TE using a count value CNT corresponding to the count result.

The edge detector 251 detects a rising edge of the data transmission timing control signal TE in response to the reference clock signal fref or frefd, generates a detection signal DET having a pulse waveform, and outputs the data transmission timing control signal TE to the frequency counter 255. The waveform of the detection signal DET may be the same as, substantially the same as, or similar to the waveform of the data transmission timing control signal TE.

The frequency counter 255 may count the first period RTR using the reference clock signal fref or frefd and generate the count value CNT corresponding to the count result. For example, the frequency counter 255 may count a number of cycles of the reference clock signal fref or frefd in the first period RTR. The frequency calculator 256 may calculate the frequency fcnt of the data transmission timing control signal TE using the count value CNT and may output the frequency fcnt to the CPU 210. The frequency counter 255 and the frequency calculator 256 may be implemented together in a single circuit according to one or more exemplary embodiments, although it is understood that one or more other exemplary embodiments are not limited thereto.

The frequency counter 255 resets a previous count value in response to the detection signal DET that has been activated, counts the first period RTR using the reference clock signal fref or frefd, and generates the count value CNT.

The CPU 210 may determine whether the frequency fcnt output from the frequency calculator 256 is within a predetermined range, e.g., a center operating frequency range, of the DDI 300 and generate a first frequency control signal based on the determination result. The center operating frequency range may be determined based on a center operating frequency and a deviation. The center operating frequency and the deviation may vary with the design specification of the DDI 300. For example, when the center operating frequency is 60 Hz and the deviation is ±0.2%, the center operating frequency range may be determined to be from 59.88 to 60.12 Hz.

The DDI 300 may adjust (e.g., increase or decrease) the frequency of the data transmission timing control signal TE based on a second frequency control signal related to the first frequency control signal generated by the host 200. For example, when the frequency fcnt does not exist within the center operating frequency range, the host 200 outputs the first frequency control signal to the DDI 300, so that the DDI 300 can adjust in real time the frequency of the data transmission timing control signal TE based on the second frequency control signal related to or based on the first frequency control signal. For example, when the first frequency control signal is transmitted in a form of a command, the second frequency control signal may be a decoded command.

In FIG. 4, RTRa denotes a first period of the data transmission timing control signal TE having the frequency adjusted by the DDI 300. As the first period of the data transmission timing control signal TE is adjusted (e.g., increased) based on the first frequency control signal generated by the host 200, the first periods RTR and RTRa are different from each other, as shown in FIG. 4.

The frequency counter 255 counts the first period RTRa using the reference clock signal fref or frefd and generates the count value CNT corresponding to the count result. The frequency calculator 256 calculates the frequency fcnt of the data transmission timing control signal TE using the count value CNT and outputs the frequency fcnt to the CPU 210. The CPU 210 compares the frequency fcnt with the center operating frequency range and determines whether to generate a first frequency control signal based on the comparison result and/or or determines a type of the first frequency control signal (e.g., instructing to increase, decrease, or maintain the frequency of the data transmission timing control signal TE).

Referring to CASE II in FIG. 4, the frequency calculation circuit 250A may count a particular period (e.g., a falling edge-to-falling edge interval (hereinafter, referred to as a "second period") FTF of the data transmission timing control signal TE using the reference clock signal fref or frefd and may calculate the frequency fcnt of the data transmission timing control signal TE using the count value CNT corresponding to the count result.

The edge detector 251 detects a falling edge of the data transmission timing control signal TE, generates the detection signal DET having a pulse waveform, and outputs the data transmission timing control signal TE to the frequency counter 255. The frequency counter 255 counts the second period FTF using the reference clock signal fref or frefd and generates the count value CNT. The frequency calculator 256 calculates the frequency fcnt of the data transmission timing control signal TE using the count value CNT and outputs the frequency fcnt to the CPU 210.

The CPU 210 may determine whether the frequency fcnt output from the frequency calculator 256 is within a predetermined range, e.g., the center operating frequency range of the DDI 300 and control the generation of a first frequency control signal based on the determination result.

The DDI 300 may adjust the frequency of the data transmission timing control signal TE based on a second frequency control signal related to the first frequency control signal generated by the host 200. For example, when the frequency fcnt does not exist within the center operating frequency range, the host 200 outputs the first frequency control signal to the DDI 300, so that the DDI 300 can adjust in real time the frequency of the data transmission timing control signal TE based on the first frequency control signal.

In FIG. 4, FTFa denotes a second period of the data transmission timing control signal TE having the frequency adjusted by the DDI 300. As the second period of the data transmission timing control signal TE is adjusted (e.g., increased) based on the first frequency control signal generated by the host 200, the second periods FTF and FTFa are different from each other, as shown in FIG. 4.

The frequency counter 255 counts the second period FTFa using the reference clock signal fref or frefd and generates the count value CNT. The frequency calculator 256 calculates the frequency fcnt of the data transmission timing control signal TE using the count value CNT and outputs the frequency fcnt to the CPU 210. The CPU 210 compares the frequency fcnt with the center operating frequency range and determines whether to generate a first frequency control signal based on the comparison result.

The frequency divider 253 divides the output clock signal fref of the crystal oscillator X-OSC by a predetermined division factor and outputs the frequency-divided clock signal frefd to the frequency counter 255. Accordingly, the reference clock signal may be the output clock signal fref of the crystal oscillator X-OSC or the frequency-divided clock signal frefd. The division factor may be decided according to the design specification of the host 200. It is understood that in one or more other exemplary embodiments, the frequency divider 253 may be omitted.

The frequency fcnt of the data transmission timing control signal TE is transmitted to the CPU 210 in the present exemplary embodiment illustrated in FIG. 2. However, it is understood that one or more other exemplary embodiments are not limited thereto. For example, according to another exemplary embodiment, the count value CNT is directly transmitted to the CPU 210. In this case, the CPU 210 may calculate the frequency fcnt of the data transmission timing control signal TE using the count value CNT, determine whether the frequency fcnt exists within the predetermined range, e.g., the center operating frequency range, and decide whether to generate the first frequency control signal based on the determination result.

Figure 3:
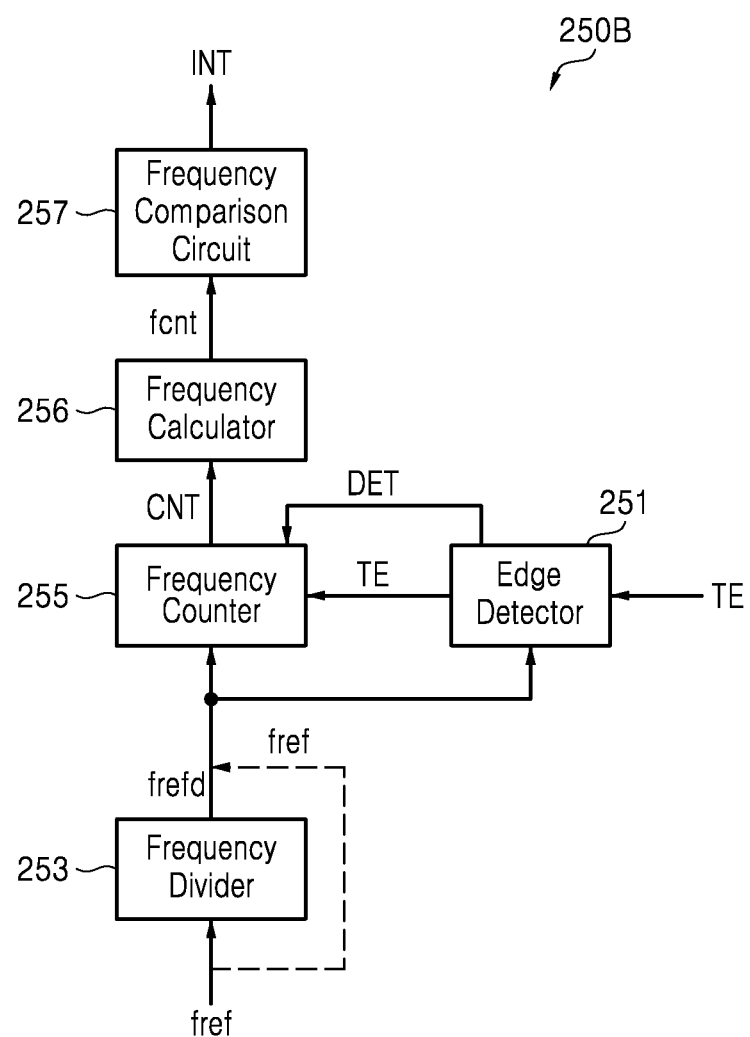
FIG. 3 is a block diagram of a frequency calculation circuit according to another exemplary embodiment.
Figure 5A:
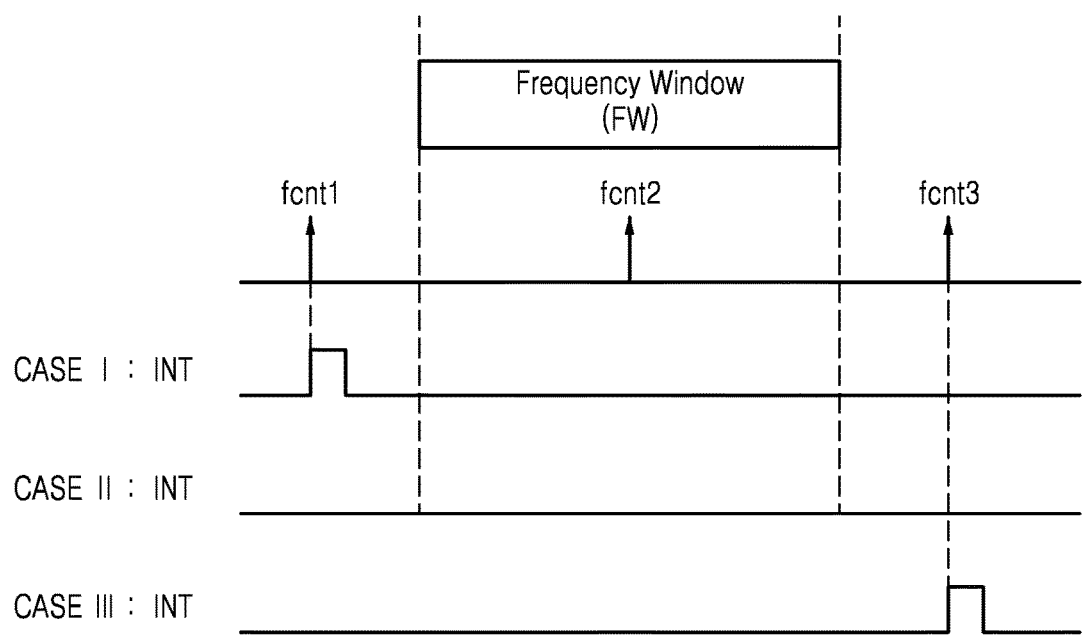
FIGS. 5A and 5B are timing charts of an operation of a frequency calculation circuit according to another exemplary embodiment.
Figure 5B:
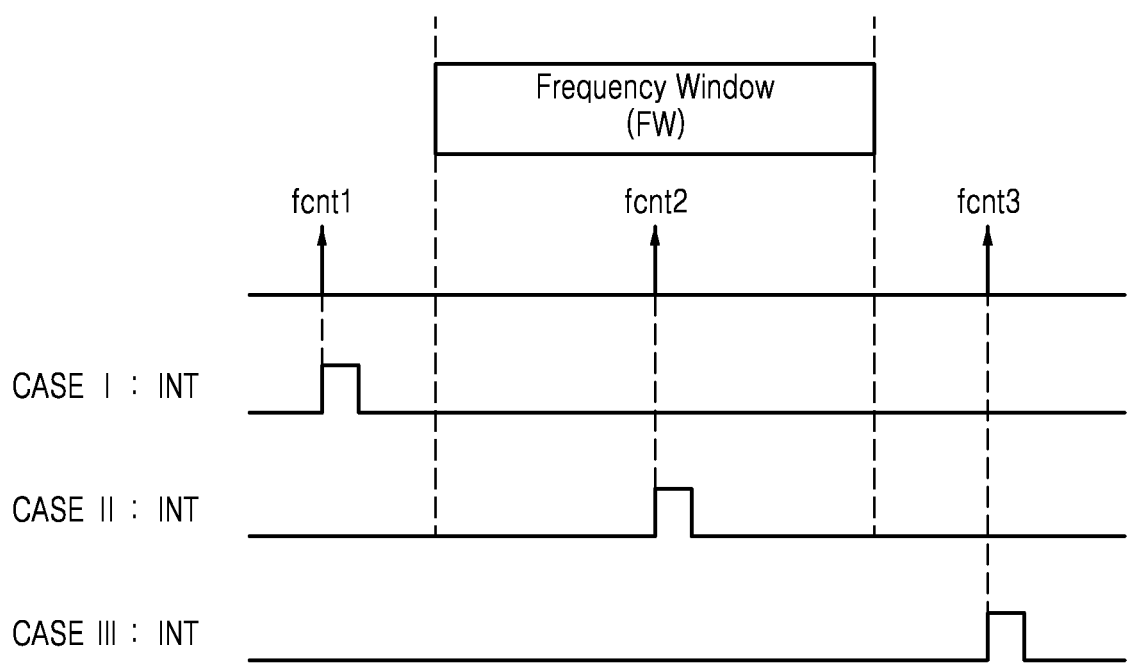

FIG. 3 is a block diagram of a frequency calculation circuit 250B according to another exemplary embodiment. By way of example, the frequency calculation circuit 250B may be implemented as the frequency calculation circuit 250 illustrated in FIG. 1. Apart from a frequency comparison circuit 257 (e.g., frequency comparer), the structure and operations of the frequency calculation circuit 250B illustrated in FIG. 3 are the same as, substantially the same as, or similar to those of the frequency calculation circuit 250A illustrated in FIG. 2. FIGS. 5A and 5B are timing charts of an operation of the frequency calculation circuit 250B according to another exemplary embodiment.

Referring to FIGS. 3, 5A, and 5B, the frequency comparison circuit 257 may determine whether the frequency fcnt output from the frequency calculator 256 exists within a predetermined range, e.g., a frequency window FW, and may output a control signal (e.g., an interrupt INT) to the CPU 210 according to the determination result. The frequency comparison circuit 257 may function as an interrupt generation circuit that generates the interrupt INT.

The frequency window FW illustrated in FIGS. 5A and 5B may be the same as, substantially the same as, or similar to the center operating frequency range described above with reference to FIGS. 2 and 4. Referring to CASE I in FIGS. 5A and 5B, when the frequency fcnt (=fcnt1) calculated by the frequency calculator 256 is lower than the lower limit of the frequency window FW, the frequency comparison circuit 257 may output a first interrupt INT to the CPU 210. The CPU 210 may generate a first frequency control signal instructing to increase the frequency of the operating clock signal of the DDI 300 in response to the first interrupt INT. Accordingly, the DDI 300 may increase the frequency of the data transmission timing control signal TE based on the first frequency control signal.

Referring to CASE II in FIG. 5A, when the frequency fcnt (=fcnt2) calculated by the frequency calculator 256 is between or within the lower limit and the upper limit of the frequency window FW, the frequency comparison circuit 257 does not output the interrupt INT to the CPU 210. Meanwhile, referring to CASE II in FIG. 5B, when the frequency fcnt (=fcnt2) calculated by the frequency calculator 256 is between or within the lower limit and the upper limit of the frequency window FW, the frequency comparison circuit 257 outputs a second interrupt INT to the CPU 210. The CPU 210 may generate a first frequency control signal instructing to maintain the frequency of the operating clock signal of the DDI 300 in response to the second interrupt INT. In one or more other exemplary embodiments, the CPU 210 may not generate the first frequency control signal, so that the DDI 300 maintains the frequency of the data transmission timing control signal TE.

Referring to CASE III in FIGS. 5A and 5B, when the frequency fcnt (=fcnt3) calculated by the frequency calculator 256 is higher than the upper limit of the frequency window FW, the frequency comparison circuit 257 may output a third interrupt INT to the CPU 210. The CPU 210 may generate a first frequency control signal instructing to decrease the frequency of the operating clock signal of the DDI 300 in response to the third interrupt INT. Accordingly, the DDI 300 may decrease the frequency of the data transmission timing control signal TE based on the first frequency control signal.

Figure 6:
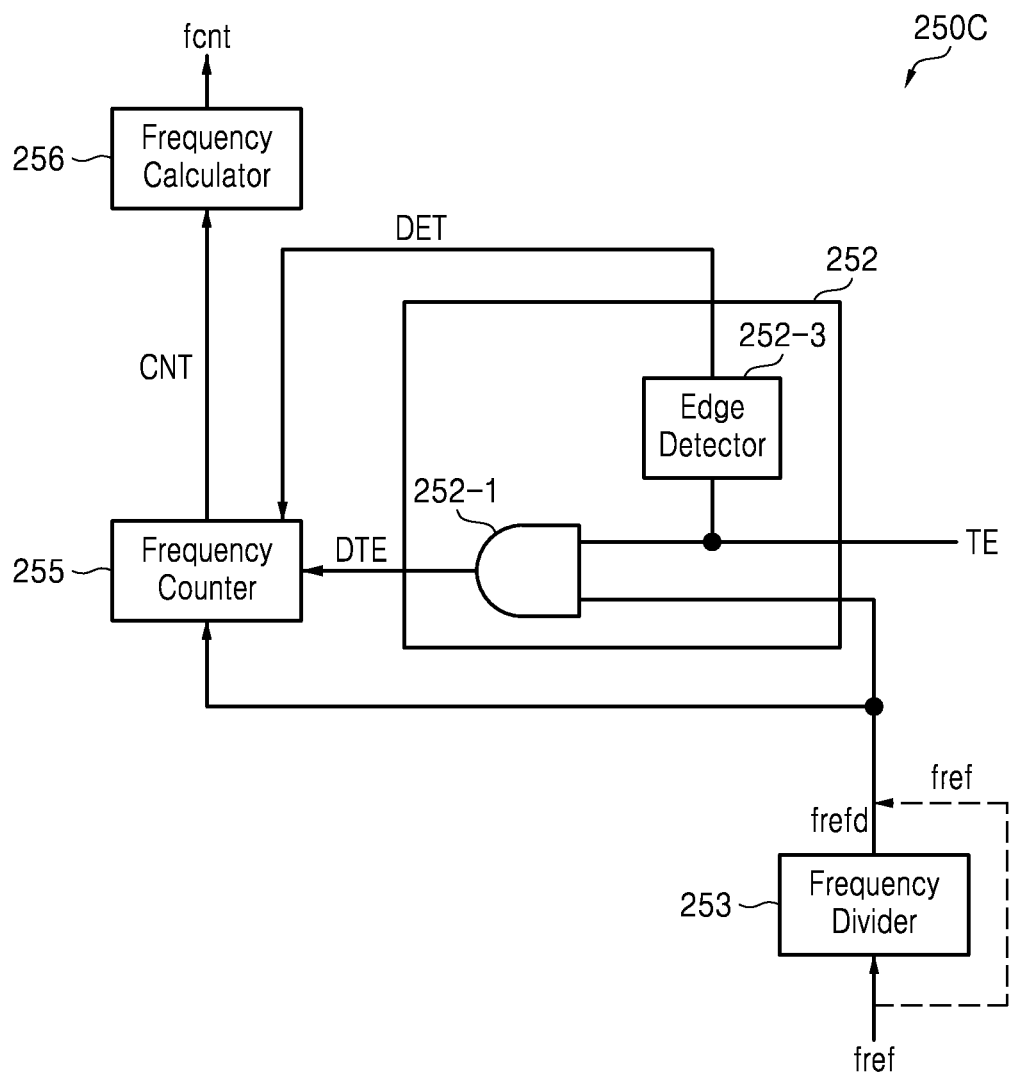
FIG. 6 is a block diagram of a frequency calculation circuit according to yet another exemplary embodiment.
Figure 7:
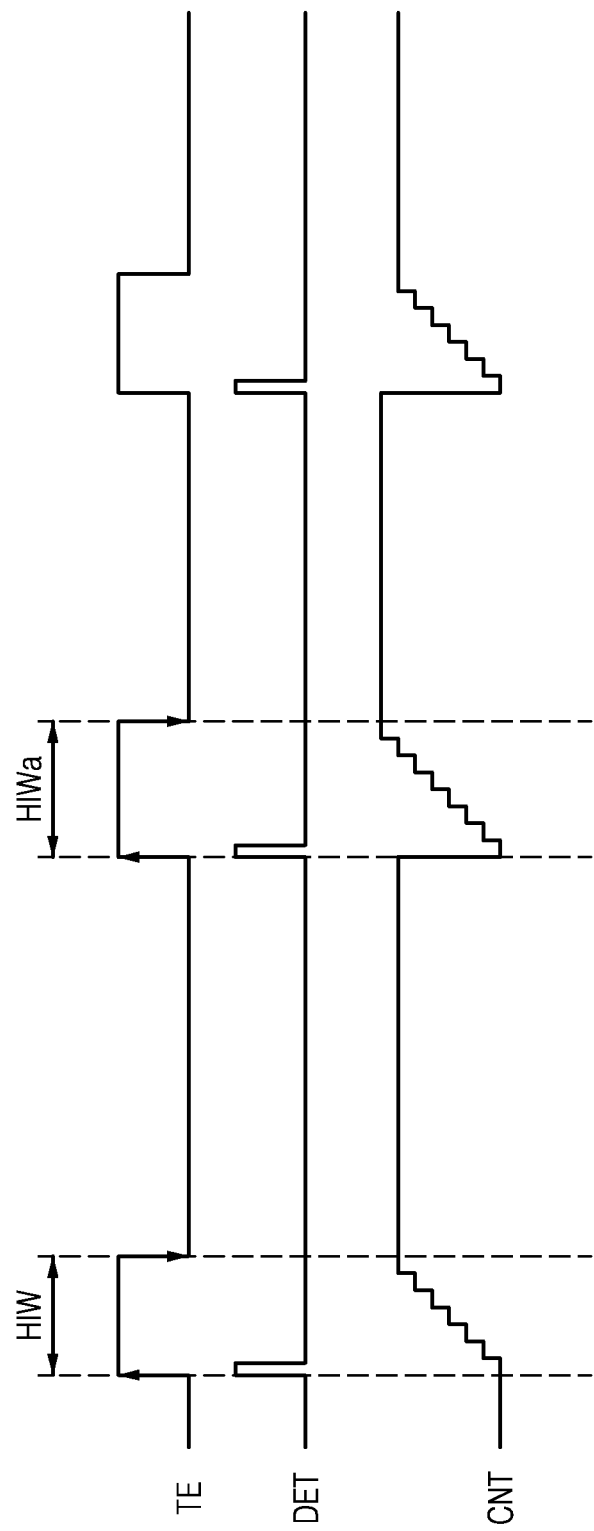
FIG. 7 is a timing chart of an operation of the frequency calculation circuit illustrated in FIG. 6.

FIG. 6 is a block diagram of a frequency calculation circuit 250C according to yet another exemplary embodiment. By way of example, the frequency calculation circuit 250C may be implemented as the frequency calculation circuit 250 illustrated in FIG. 1. FIG. 7 is a timing chart of an operation of the frequency calculation circuit 250C illustrated in FIG. 6. Referring to FIG. 6, the frequency calculation circuit 250C includes an edge detection circuit 252, the frequency counter 255, and the frequency calculator 256. The frequency calculation circuit 250C may also include the frequency divider 253.

Referring to FIGS. 6 and 7, the frequency calculation circuit 250C may count a particular period (e.g., a high period width HIW) of the data transmission timing control signal TE using the reference clock signal fref or frefd and may calculate the frequency fcnt of the data transmission timing control signal TE using the count value CNT corresponding to the count result.

The edge detection circuit 252 may include an AND gate 252-1 and an edge detector 252-3. The AND gate 252-1 performs an AND operation on the data transmission timing control signal TE and the reference clock signal fref or frefd and outputs an operation result DTE to the frequency counter 255. The edge detector 252-3 may generate a detection signal DET in response to the data transmission timing control signal TE. The edge detection circuit 252 may generate a detection signal DET that is activated in response to a rising edge of the data transmission timing control signal TE. The frequency counter 255 may reset the previous count value CNT in response to the detection signal DET that has been activated, count the operation result DTE output from the AND gate 252-1 using the reference clock signal fref or frefd, and output the current count value CNT corresponding to the count result.

The frequency calculator 256 calculates the frequency fcnt of the data transmission timing control signal TE using the count value CNT and outputs the calculated frequency fcnt to the CPU 210. The CPU 210 may determine whether the frequency fcnt output from the frequency calculator 256 is within a predetermined range (e.g., the center operating frequency range) of the DDI 300 and control the generation of a first frequency control signal based on the determination result.

The DDI 300 may adjust the frequency of the data transmission timing control signal TE based on a second frequency control signal related to or based on the first frequency control signal generated by the host 200. For example, when the first frequency control signal is transmitted in a form of a command, the second frequency control signal may be a decoded command.

When the calculated frequency fcnt is outside the center operating frequency range, the host 200 outputs the first frequency control signal to the DDI 300, so that the DDI 300 adjusts the frequency of the data transmission timing control signal TE in real time based on the first frequency control signal.

Referring to FIG. 7, HIWa denotes a high period width of the data transmission timing control signal TE that has been adjusted by the DDI 300. As the high period width HIW of the data transmission timing control signal TE is adjusted (e.g., increased) based on the first frequency control signal generated by the host 200, the high period widths HIW and HIWa are different from each other, as shown in FIG. 7. The high period widths HIW and HIWa may be adjusted in a unit of line time.

Figure 8:
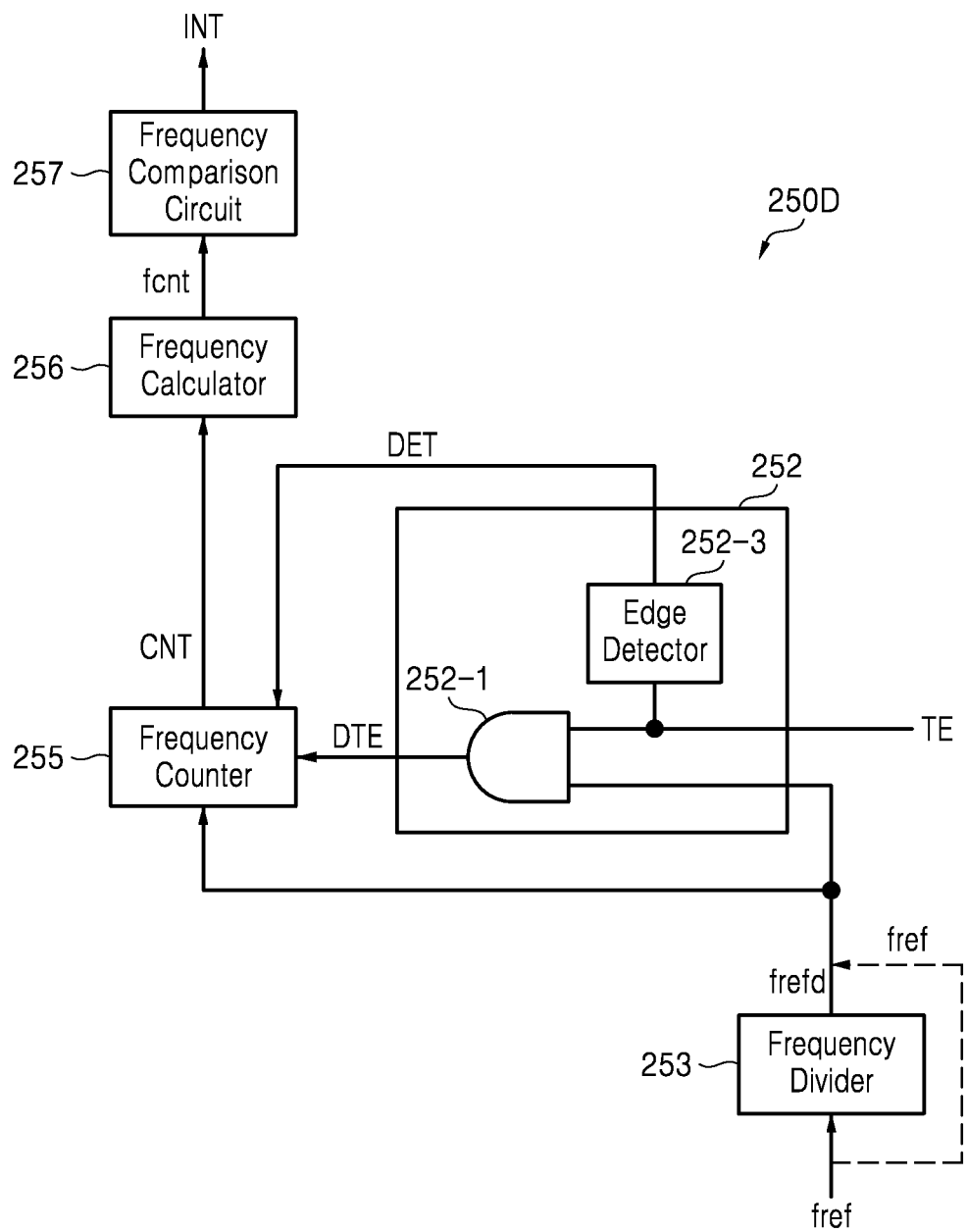
FIG. 8 is a block diagram of a frequency calculation circuit according to still another exemplary embodiment.

FIG. 8 is a block diagram of a frequency calculation circuit 250D according to still another exemplary embodiment. By way of example, the frequency calculation circuit 250D may be implemented as the frequency calculation circuit 250 illustrated in FIG. 1. Apart from the frequency comparison circuit 257, the structure and operations of the frequency calculation circuit 250D illustrated in FIG. 8 may be the same as, substantially the same as, or similar to those of the frequency calculation circuit 250C illustrated in FIG. 6. The operations of the frequency comparison circuit 257 illustrated in FIG. 8 may be the same as, substantially the same as, or similar to those of the frequency comparison circuit 257 that have been described above with reference to FIGS. 3, 5A, and 5B.

Figure 9:
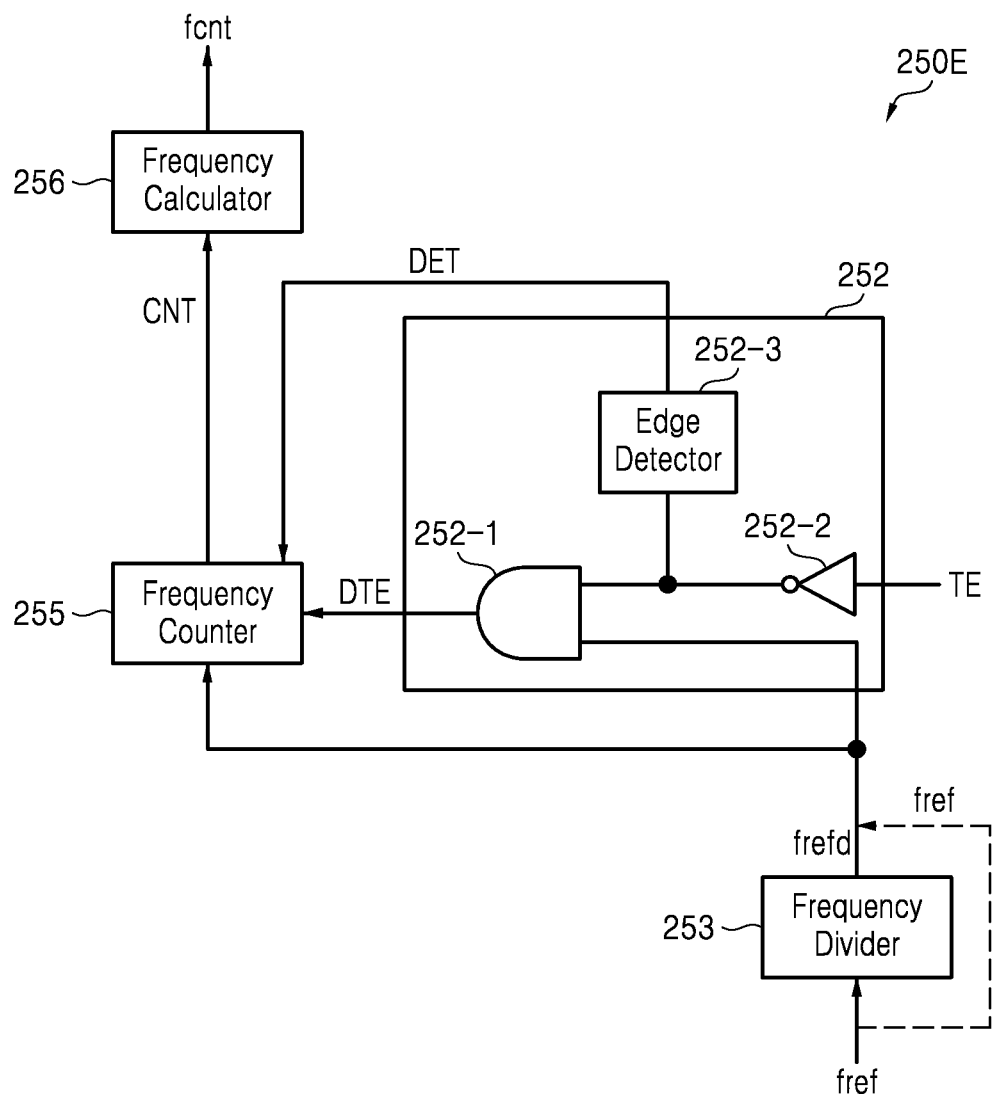
FIG. 9 is a block diagram of a frequency calculation circuit according to another exemplary embodiment.
Figure 10:
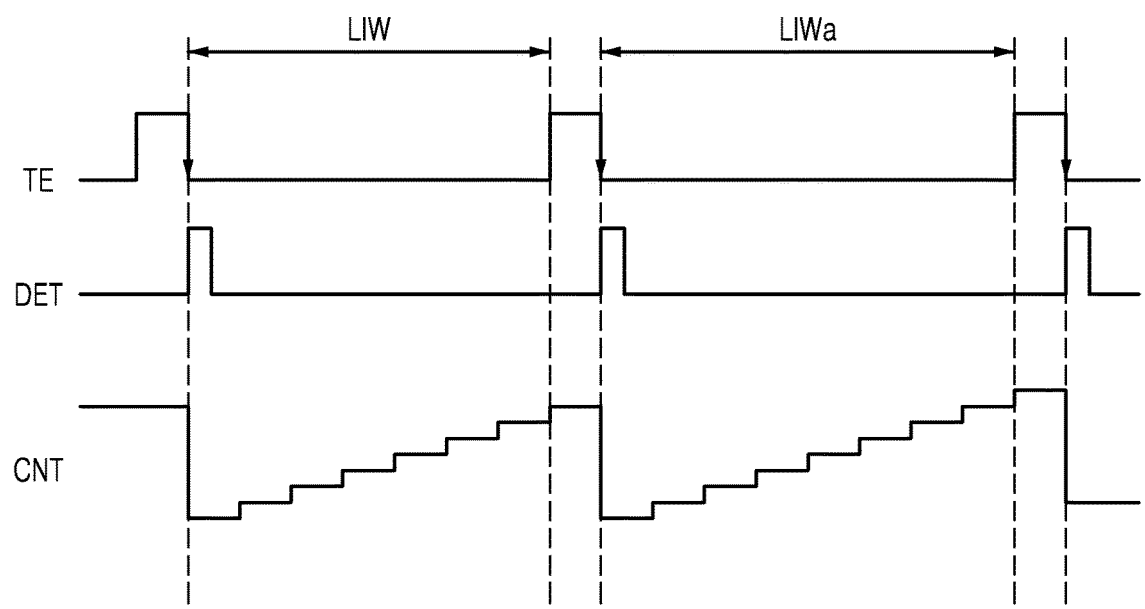
FIG. 10 is a timing chart of an operation of the frequency calculation circuit illustrated in FIG. 9.

FIG. 9 is a block diagram of a frequency calculation circuit 250E according to another exemplary embodiment. By way of example, the frequency calculation circuit 250E may be implemented as the frequency calculation circuit 250 illustrated in FIG. 1. FIG. 10 is a timing chart of an operation of the frequency calculation circuit 250E illustrated in FIG. 9. The frequency calculation circuit 250E includes an edge detection circuit 252, a frequency counter 255, and a frequency calculator 256. The frequency calculation circuit 250E may also include a frequency divider 253.

Referring to FIGS. 9 and 10, the frequency calculation circuit 250E may count a particular period (e.g., a low period width LIW) of the data transmission timing control signal TE using the reference clock signal fref or frefd and may calculate the frequency fcnt of the data transmission timing control signal TE using the count value CNT.

The edge detection circuit 252 may include the AND gate 252-1, an inverter 252-2, and an edge detector 252-3. The inverter 252-2 inverts the data transmission timing control signal TE and outputs the inverted data transmission timing control signal to the AND gate 252-1 and the edge detector 252-3. The AND gate 252-1 performs an AND operation on the output signal of the inverter 252-2 and the reference clock signal fref or frefd and outputs the operation result DTE to the frequency counter 255.

The edge detection circuit 252 may generate the detection signal DET that is activated in response to a falling edge of the data transmission timing control signal TE. The frequency counter 255 may reset the previous count value CNT in response to the detection signal DET that has been activated, count the operation result DTE output from the AND gate 252-1 using the reference clock signal fref or frefd, and output the count value CNT. The operations of the elements 253, 255, and 256 illustrated in FIG. 9 may be the same as, substantially the same as, or similar to those of the elements 253, 255, and 256 illustrated in FIG. 6.

Referring to FIG. 10, LIWa denotes a low period width of the data transmission timing control signal TE that has been adjusted by the DDI 300. As the low period width LIW of the data transmission timing control signal TE is adjusted (e.g., increased) based on the first frequency control signal generated by the host 200, the low period widths LIW and LIWa are different from each other, as shown in FIG. 10.

Figure 11:
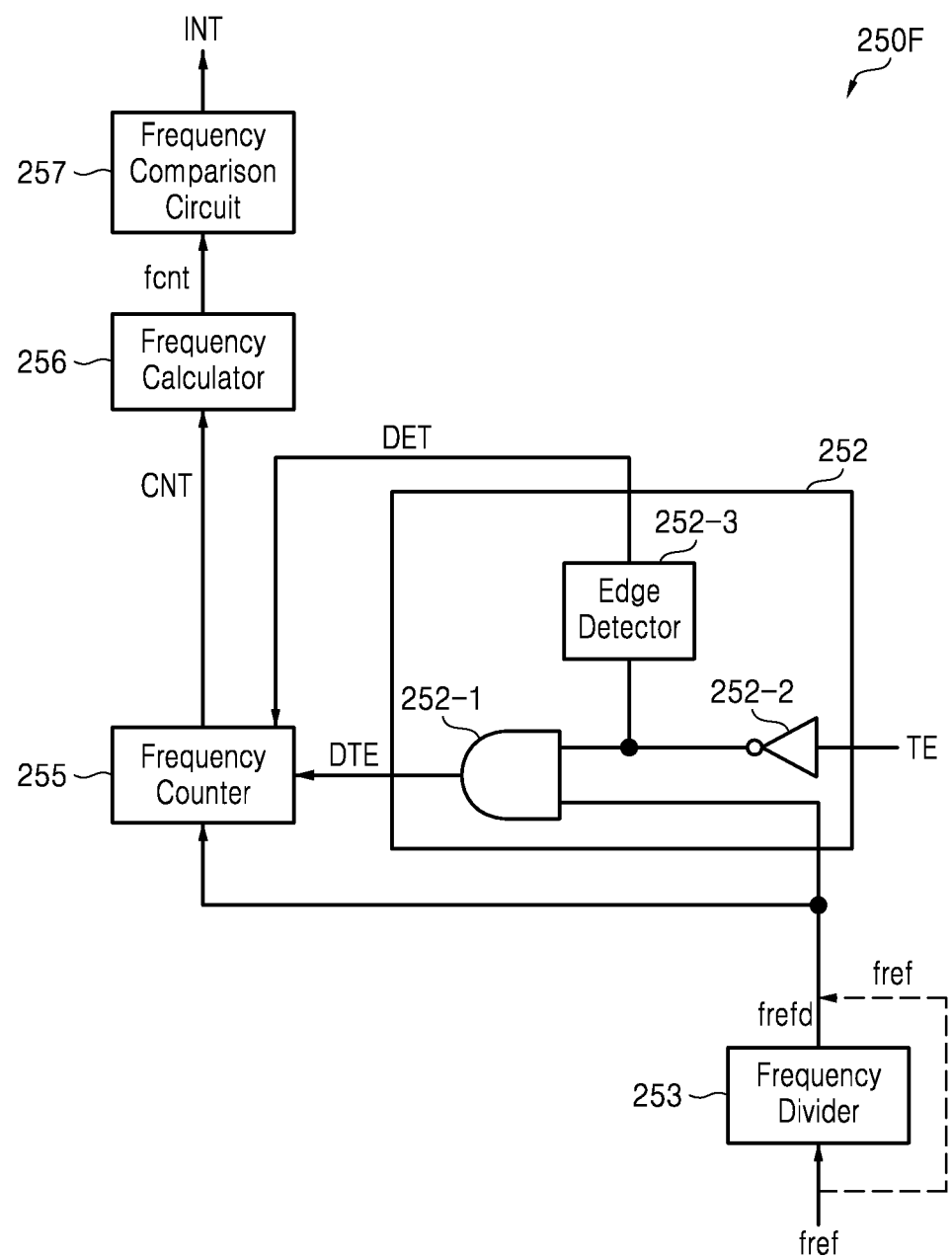
FIG. 11 is a block diagram of a frequency calculation circuit according to yet another exemplary embodiment.

FIG. 11 is a block diagram of a frequency calculation circuit 250F according to yet another exemplary embodiment. By way of example, the frequency calculation circuit 250F may be implemented as the frequency calculation circuit 250 illustrated in FIG. 1. Apart from the frequency comparison circuit 257, the structure and operations of the frequency calculation circuit 250F illustrated in FIG. 11 may be the same as, substantially the same as, or similar to those of the frequency calculation circuit 250E illustrated in FIG. 9. The operations of the frequency comparison circuit 257 illustrated in FIG. 11 may be the same as, substantially the same as, or similar to those of the frequency comparison circuit 257 that have been described above with reference to FIGS. 3, 5A, and 5B.

Figure 12:
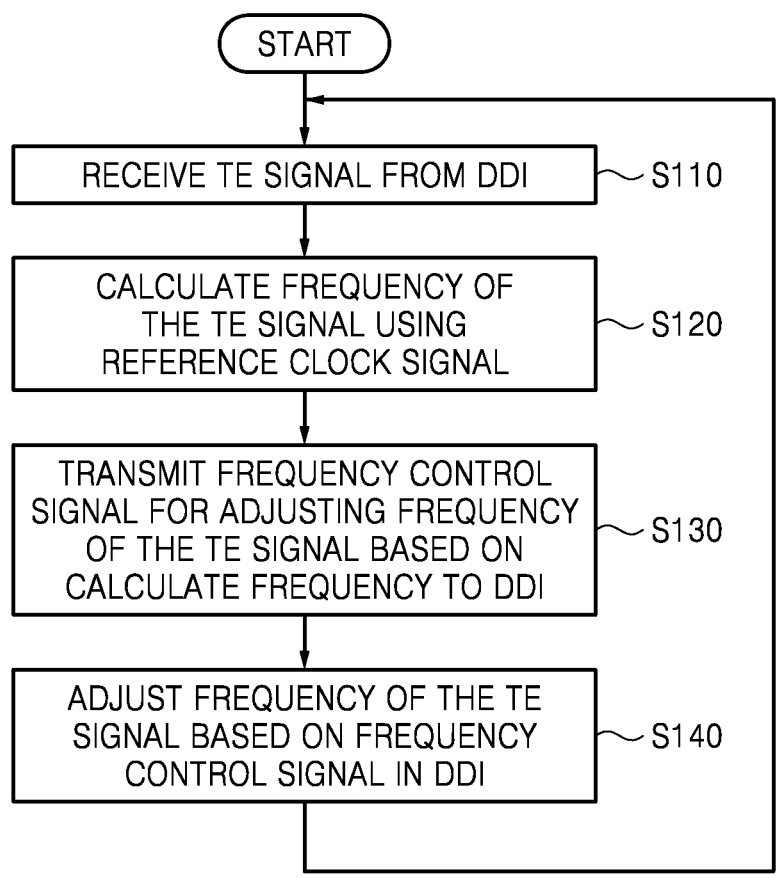
FIG. 12 is a flowchart of a method of operating a system according to an exemplary embodiment.

FIG. 12 is a flowchart of a method of operating a system 100 according to an exemplary embodiment. Referring to FIGS. 1 through 12, the host 200 receives the data transmission timing control signal TE from the DDI 300 in operation S110.

The host 200 calculates the frequency fcnt of the data transmission timing control signal TE using the reference clock signal fref or frefd in operation S120. For example, the frequency calculation circuit 250 of the host 200 counts a particular period of the data transmission timing control signal TE using the reference clock signal fref or frefd, generates the count value CNT, and calculates the frequency of the data transmission timing control signal TE using the count value CNT in operation S120. While in the present exemplary embodiment, the host 200 calculates the frequency fcnt of the data transmission timing control signal TE (operation S120), it is understood that one or more other exemplary embodiments are not limited thereto. For example, according to another exemplary embodiment, an external frequency calculation circuit (i.e., external to the host 200) may calculate the frequency fcnt of the data transmission timing control signal TE, and transmit the calculated frequency fcnt to the host 200.

The CPU 210 generates a first frequency control signal for adjusting the frequency of the data transmission timing control signal TE based on the calculated frequency fcnt and transmits the first frequency control signal to the DDI 300 in operation S130.

The DDI 300 adjusts the frequency of the internal clock signal ifc of the oscillator 330 based on a second frequency control signal corresponding to the first frequency control signal transmitted from the host 200. For example, when the first frequency control signal is transmitted in a form of a command, the second frequency control signal may be a decoded command. The DDI 300 adjusts the frequency of the data transmission timing control signal TE based on the second frequency control signal in operation S140. The DDI 300 transmits the data transmission timing control signal TE whose frequency has been adjusted to the host 200. As described above, the frequency of the operating clock signal (e.g., the internal clock signal ifc) of the DDI 300 is adjusted, so that the DDI 300 performs a PSR using the operating clock signal having the adjusted frequency.

Figure 13:
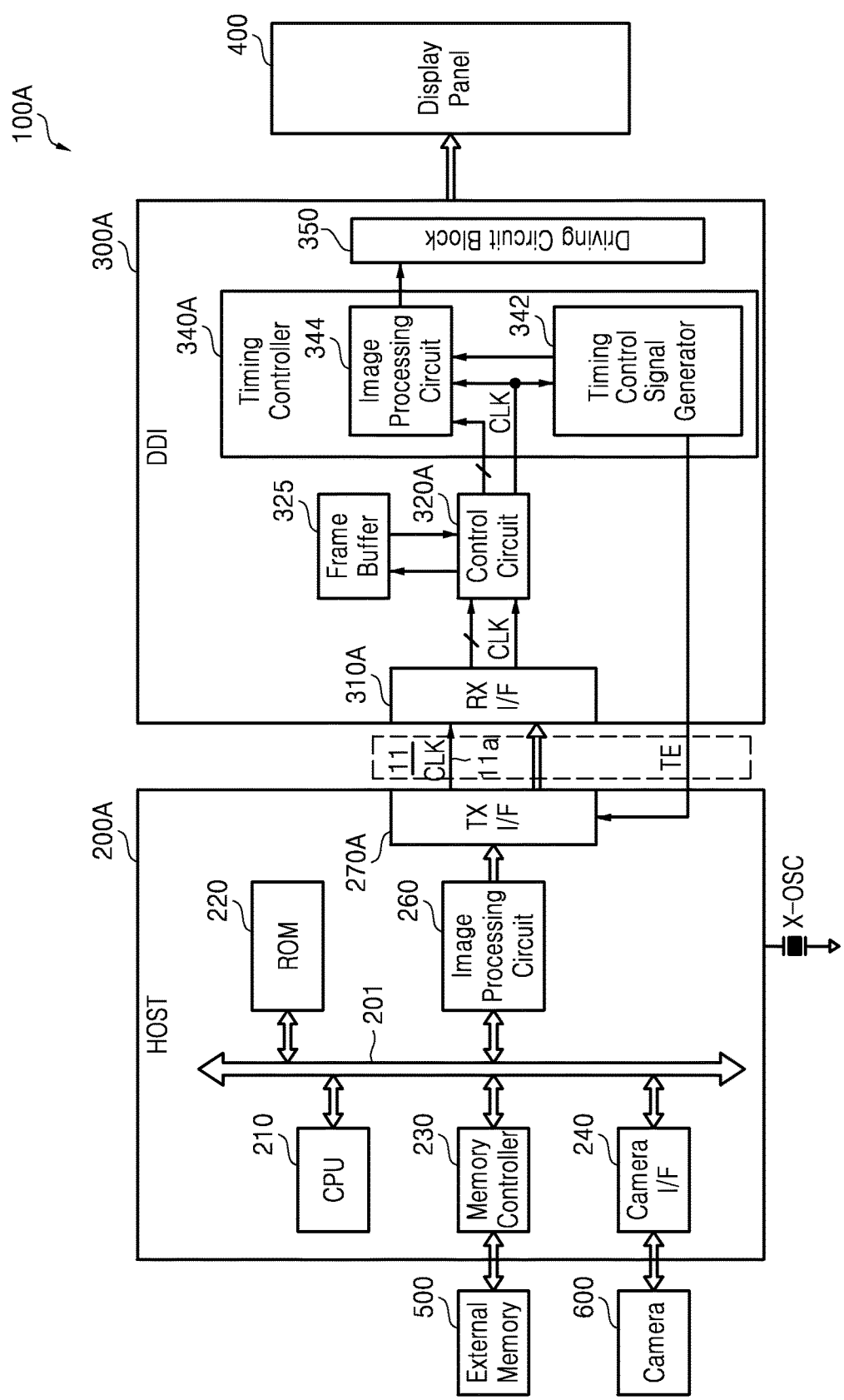
FIG. 13 is a block diagram of a system according to another exemplary embodiment.

FIG. 13 is a block diagram of a system 100A according to another exemplary embodiment. Referring to FIG. 13, the system 100A includes a host 200A, a DDI 300A, a display panel 400, an external memory 500, and a camera 600. Apart from a TX I/F 270A and the frequency calculation circuit 250, the structure and operations of the host 200A illustrated in FIG. 13 may be the same as, substantially the same as, or similar to those of the host 200 illustrated in FIG. 1.

In addition to a clock signal used for the transmission of image data, the host 200A transmits an exclusive clock signal CLK to the DDI 300A through an exclusive transmission line 11a. In other words, an interface 11 includes a transmission line for the transmission of the clock signal, a transmission line for the transmission of the image data, and the exclusive transmission line 11a for the transmission of the exclusive clock signal CLK. When the interface 11 supports MIPI or eDP, the interface 11 further includes the exclusive transmission line 11a for the transmission of the exclusive clock signal CLK.

The DDI 300A may use the exclusive clock signal CLK as an operating clock signal. In the present exemplary embodiment, the DDI 300A does not include an oscillator. The exclusive clock signal CLK is indifferent to process variation, voltage variation, and/or temperature variation.

An RX I/F 310A of the DDI 300A restores data, a data enable signal, and synchronous signals from image data using a clock signal and transmits the clock signal to a control circuit 320A. The RX I/F 310A also transmits the exclusive clock signal CLK to the control circuit 320A.

During a write operation, the control circuit 320A writes the restored data to the frame buffer 325 using the clock signal and write control signals. During a read operation, the control circuit 320A reads data (e.g., the restored data) from the frame buffer 325 using the exclusive clock signal CLK and read control signals and transmits the read data to the image processing circuit 344. The read control signals may be generated using the exclusive clock signal CLK.

The timing control signal generator 342 of a timing controller 340A generates the data transmission timing control signal TE using the exclusive clock signal CLK and transmits the data transmission timing control signal TE to the host 200A. The TX I/F 270A transmits image data to the DDI 300A based on the data transmission timing control signal TE.

The image processing circuit 344 of the timing controller 340A processes data output from the control circuit 320A using the exclusive clock signal CLK and transmits display data corresponding to the processing result to the driving circuit block 350. As described above, the DDI 300A processes image data transmitted from the host 200A using the exclusive clock signal CLK, which is transmitted from the host 200A through the exclusive transmission line 11a, as the operating clock signal.

Figure 14:
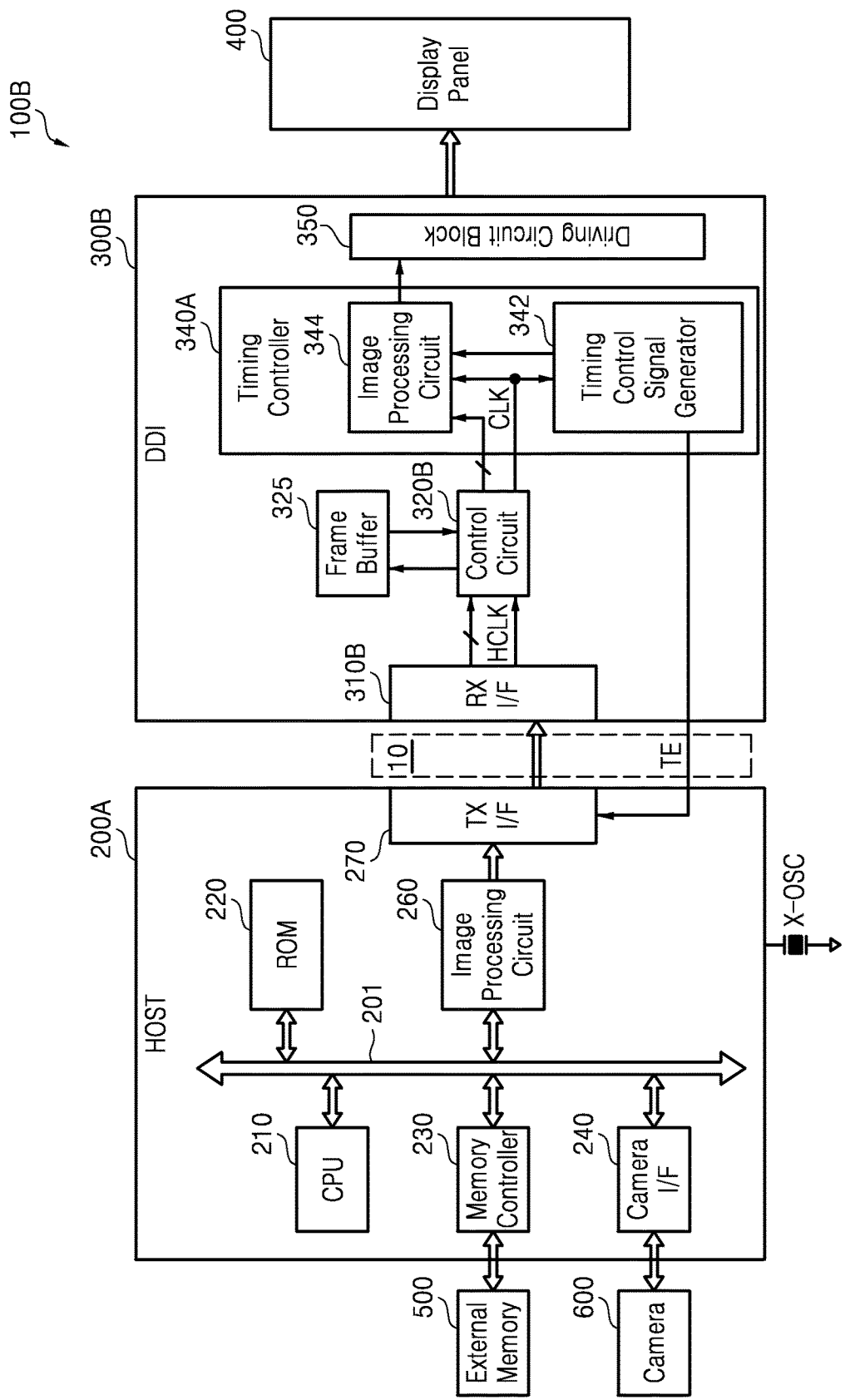
FIG. 14 is a block diagram of a system according to still another exemplary embodiment.

FIG. 14 is a block diagram of a system 100B according to yet another exemplary embodiment. The system 100B includes a host 200A, a DDI 300B, a display panel 400, an external memory 500, and a camera 600. Apart from the frequency calculation circuit 250, the structure and operations of the host 200A illustrated in FIG. 14 may be the same as, substantially the same as, or similar to those of the host 200 illustrated in FIG. 1.

During the operation of the system 100B, the host 200A constantly (e.g., all the time) transmits a clock signal HCLK to the DDI 300B. The DDI 300B uses the clock signal CLK related to the clock signal HCLK as an operating clock signal and the DDI 300B does not include an oscillator. At this time, the frequency of the clock signal HCLK is higher than that of the clock signal CLK. The clock signal HCLK may be a MIPI clock signal. When the system 100B operates in the MIPI command mode, the host 200A constantly provides a clock signal for the DDI 300B.

The clock signal HCLK is indifferent to process variation, voltage variation, and/or temperature variation of the DDI 300B. An RX I/F 310B of the DDI 300B restores data, a data enable signal, and synchronous signals from image data using the clock signal HCLK and transmits the clock signal HCLK to a control circuit 320B.

During a write operation, the control circuit 320B writes the restored data to the frame buffer 325 using the clock signal HCLK and write control signals. During a read operation, the control circuit 320B reads data (e.g., the restored data) from the frame buffer 325 using the clock signal CLK and read control signals and transmits the read data to the image processing circuit 344. The read control signals may be generated using the clock signal CLK.

The timing control signal generator 342 of a timing controller 340A generates the data transmission timing control signal TE using the clock signal CLK and transmits the data transmission timing control signal TE to the host 200A. The TX I/F 270 transmits image data to the DDI 300B based on the data transmission timing control signal TE.

The image processing circuit 344 of the timing controller 340A processes data output from the control circuit 320B using the clock signal CLK and transmits display data corresponding to the processing result to the driving circuit block 350.

Figure 15:
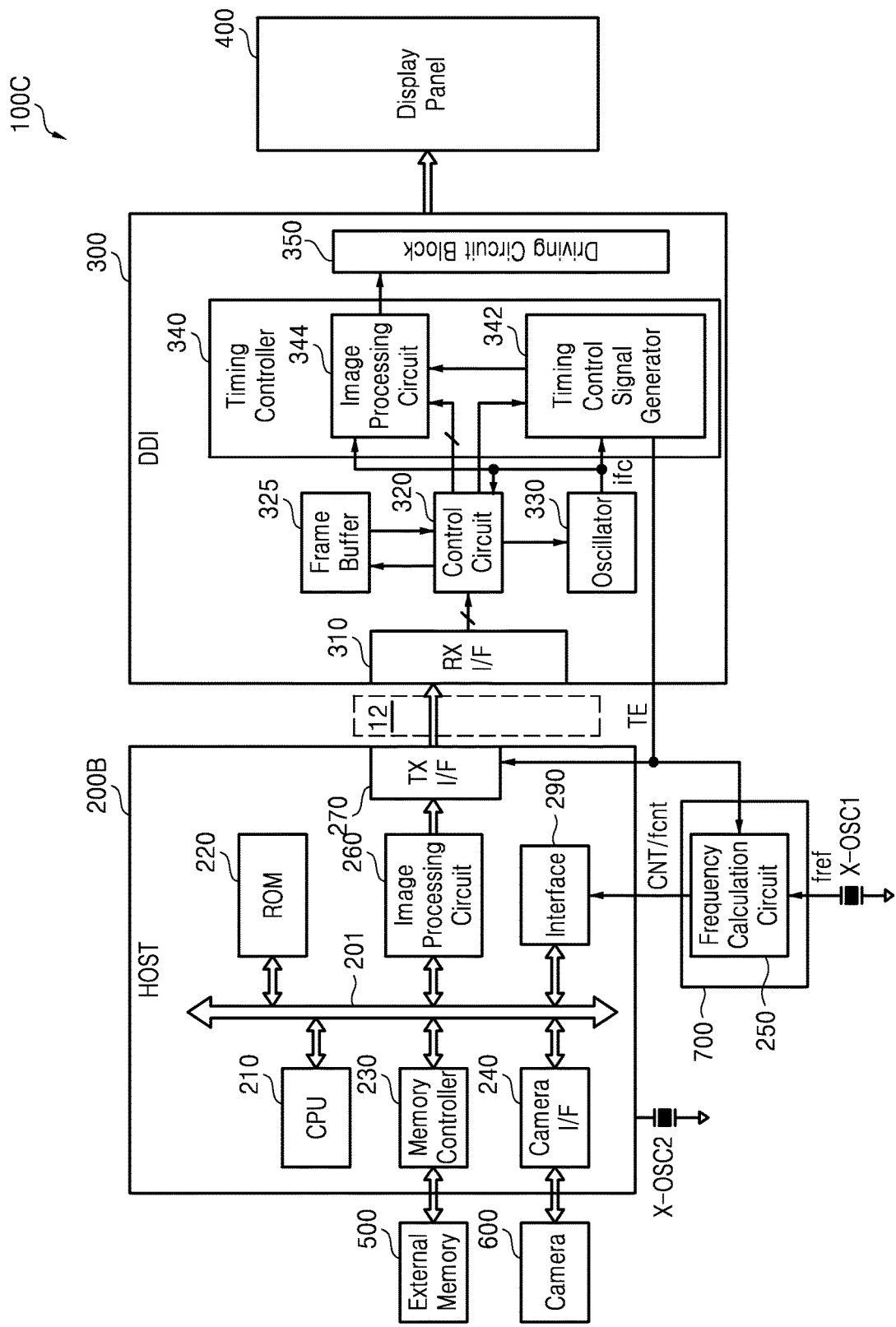
FIG. 15 is a block diagram of a system according to yet another exemplary embodiment.

FIG. 15 is a block diagram of a system 100C according to still another exemplary embodiment. The system 100C includes a host 200B, a DDI 300, a display panel 400, an external memory 500, a camera 600, and a frequency calculation IC 700. Apart from an interface 290, the structure and operations of the host 200B illustrated in FIG. 15 may be the same as, substantially the same as, or similar to those of the host 200 illustrated in FIG. 1. The host 200B and the frequency calculation IC 700 may communicate with each other via the interface 290. The frequency calculation IC 700 may include any of the above-described frequency calculation circuits 250, 250A, 250B, 250C, 250D, 250E, 250F.

The frequency calculation IC 700 calculates the frequency fcnt of the data transmission timing control signal TE and/or counts a period of the data transmission timing control signal TE using the reference clock signal fief or frefd to generate a count value CNT corresponding to the count result.

The count value CNT or the frequency fcnt calculated by the frequency calculation circuit 250 of the frequency calculation IC 700 is transmitted to the CPU 210 via the interface 290 and the bus 201 in the host 200B. The CPU 210 generates a first frequency control signal using the count value CNT (e.g., by determining the frequency fcnt based on the count value CNT) or the frequency fcnt and transmits the first frequency control signal to the DDI 300 via the TX I/F 270 and an interface 12. The DDI 300 adjusts the frequency of its operating clock signal based on the first frequency control signal.

The interface 12 includes a transmission line for the transmission of a clock signal and a transmission line for image data transmission. The interface 12 may be implemented as MIPI, eDP interface, or high-speed serial interface.

The structure and operations of the DDI 300 illustrated in FIG. 15 may be the same as, substantially the same as, or similar to those of the DDI 300 illustrated in FIG. 1. As shown in FIG. 15, the system 100C adjusts the frequency of the operating clock signal (e.g., the internal clock signal ifc) of the DDI 300 using the frequency calculation IC 700 and the host 200B.

As described above, according to exemplary embodiments, a host (for example, an IC, a SoC, a processor, an AP, a mobile AP, etc.) receives a data transmission timing control signal from a DDI, calculates a frequency of the data transmission timing control signal using a reference clock signal, generates a frequency control signal for adjusting the frequency of the data transmission timing control signal based on the calculated frequency, and transmits the frequency control signal to the DDI. The host corrects a frequency deviation in the operating clock signal of the DDI, thereby preventing erroneous operation of a device, such as a touch screen or a stylus pen, used in a system including the host and the DDI. In other words, the DDI reduces or eliminates EMI occurring due to the frequency deviation, so that other devices such as a touch screen and a stylus pen used in the system are prevented from operating abnormally.

In addition, since the host corrects the frequency deviation in the operating clock signal of the DDI, the host does not need to provide a separate reference clock signal for the DDI. As a result, the circuit structure of the system is simplified. Moreover, since the host corrects the frequency deviation in the operating clock signal of the DDI, the DDI does not require an extra crystal oscillator.

While exemplary embodiments have been particularly shown and described above, it will be understood by those of ordinary skill in the art that various changes in forms and details may be made therein without departing from the spirit and scope of the inventive concept as defined by the following claims.

What is claimed is:

1. An application processor for a display system of a portable device that displays image data on a display panel, the application processor comprising:
   a controller configured to obtain a frequency of a signal received from a display driver integrated circuit (DDI), and to generate, based on the obtained frequency, a frequency control signal for adjusting a frequency of an internal clock signal output by an operating clock of the DDI, to adjust the frequency of the signal received from the DDI; and
   a transmitter configured to transmit the generated frequency control signal to the DDI.

2. The application processor as claimed in claim 1, wherein:
   the received signal is a tearing effect signal; and
   the controller is configured to control the transmitter to transmit the image data to the DDI in response to the received tearing effect signal.

3. The application processor as claimed in claim 1, wherein the controller is configured to generate the frequency control signal in response to the obtained frequency being outside of a predetermined operating frequency range for the DDI.

4. The application processor as claimed in claim 1, further comprising:
   a frequency calculation circuit configured to receive the signal from the DDI, and to calculate, based on a reference clock signal, the frequency of the received signal,
   wherein the controller is configured to generate the frequency control signal based on the calculated frequency.

5. The application processor as claimed in claim 4, wherein the frequency calculation circuit comprises:
   a frequency counter configured to determine a count value, based on the reference clock signal, of a period of the received signal; and
   a frequency calculator configured to calculate, based on the determined count value, the frequency of the received signal.

6. The application processor as claimed in claim 1, wherein the controller is a central processing unit (CPU).

7. The application processor as claimed in claim 1, wherein the controller is an image processing circuit.

8. An application processor for a display system of a portable device that displays image data on a display panel, the application processor comprising:
   a controller configured to obtain a frequency of a data transmission timing control signal received from a display driver integrated circuit (DDI), and to generate, based on the obtained frequency, a frequency control signal for adjusting a frequency of an internal clock signal output by an operating clock of the DPI, to adjust the frequency of the data transmission timing control signal;
   a transmitter configured to transmit the generated frequency control signal to the DDI; and
   a frequency calculation circuit comprising:
   a detector configured to receive the data transmission timing control signal from
   the DDI, and a frequency calculator configured to calculate the frequency of the received data transmission timing control signal.

9. The application processor as claimed in claim 8, wherein the frequency calculator is configured to output the calculated frequency to the controller.

10. The application processor as claimed in claim 8, wherein the frequency calculation circuit further comprises:
    a frequency comparer configured to determine whether the calculated frequency is within a predetermined operating frequency range for the DDI, to generate a control signal according to the determining, and to output, to the controller, the generated control signal.

11. The application processor as claimed in claim 10, wherein:
    the frequency comparer generates, as the control signal, a first control signal in response to the calculated frequency being lower than the predetermined operating frequency range, a second control signal in response to the calculated frequency being within the predetermined operating frequency range, and a third control signal in response to the calculated frequency being higher than the predetermined operating frequency range.

12. The application processor as claimed in claim 8, wherein the frequency calculation circuit further comprises:
    a frequency counter configured to determine a count value, based on a reference clock signal, of a period of the received data transmission timing control signal,
    wherein the frequency calculator is configured to calculate, based on the determined count value, the frequency of the received data transmission timing control signal.

13. The application processor as claimed in claim 12, wherein the detector comprises an edge detector configured to detect the period of the received data transmission timing control signal based on a rising edge or a falling edge of the received data transmission timing control signal.

14. The application processor as claimed in claim 12, wherein the frequency calculation circuit further comprises:
    a frequency divider configured to divide the reference clock signal by a predetermined factor,
    wherein the frequency counter is configured to determine the count value based on the divided reference clock signal.

15. A display system that displays image data, the display system comprising:
    an application processor comprising:
    a first controller configured to obtain, from a frequency calculation circuit, a frequency of a signal provided by a display driver integrated circuit (DDI), and to generate, based on the obtained frequency, a first frequency control signal for adjusting a frequency of an internal clock signal output by an operating clock of the DDI, to adjust the frequency of the signal provided by the DDI, and a transmitter configured to transmit the generated first frequency control signal to the DDI;

the frequency calculation circuit configured to receive the signal from the DDI, to calculate, based on a reference clock signal, the frequency of the received signal, and to provide the calculated frequency to the first controller; and the DDI configured to drive a display of the image data on a display panel, the DDI comprising:

a control signal generator configured to generate the signal based on the internal clock signal, and to provide the generated signal to the application processor and the frequency calculation circuit;

a receiver configured to receive, in response to the provided signal, the first frequency control signal from the application processor; and a second controller configured to output, based on the received first frequency control signal, a second frequency control signal to adjust the frequency of the internal clock signal.

16. The display system as claimed in claim 15, wherein the display system is a portable device and the application processor is a host.

17. The display system as claimed in claim 15, wherein the signal is a tearing effect signal.

18. The display system as claimed in claim 15, wherein the DDI further comprises an oscillator configured to output the internal clock signal, wherein the DDI is configured to adjust a frequency of the internal clock signal according to the second frequency control signal.

19. The display system as claimed in claim 15, wherein the DDI is configured to adjust, according to the second frequency control signal and the internal clock signal, a frequency of the generated signal.

20. The display system as claimed in claim 19, wherein the DDI is configured to adjust the frequency of the generated signal according to a ratio between a deviated frequency of the internal clock signal and the frequency of the generated signal.

* * * * *